United States Patent [19]

Martin

[11] 4,353,167
[45] Oct. 12, 1982

[54] APPARATUS FOR HOLDING AND POSITIONING A MEASURING TAPE

[76] Inventor: Bruce S. Martin, 9427 N. Calhoun, Portland, Oreg. 97203

[21] Appl. No.: 248,951

[22] Filed: Mar. 30, 1981

[51] Int. Cl.³ .............................................. G01B 3/02
[52] U.S. Cl. .................................. 33/137 R; 33/27 C; 33/174 G
[58] Field of Search ................. 33/137 R, 174 G, 189, 33/27 C

[56] References Cited

U.S. PATENT DOCUMENTS

| | | | |
|---|---|---|---|
| 3,145,477 | 8/1964 | Morrison | 33/137 R |
| 3,601,896 | 8/1971 | Ledene | 33/137 R |
| 3,834,030 | 9/1974 | Hanson | 33/138 |

Primary Examiner—Steven L. Stephan
Attorney, Agent, or Firm—Chernoff & Vilhauer

[57] ABSTRACT

The holder of the present invention is comprised of a clamp for receiving and securing a measuring tape with its zero end being located at a known position. The clamp is pivotally joined to a base which contains a magnet for attaching the base to a ferro-magnetic surface. The apparatus is attached to the surface by positioning the base in a manner such that the zero end of the tape is located at a first meausring point. The tape is then extended by the user to measure the distance from the first measuring point to a second measuring point, which is remote from it, without the necessity of having a second person to hold the zero end of the tape.

7 Claims, 16 Drawing Figures

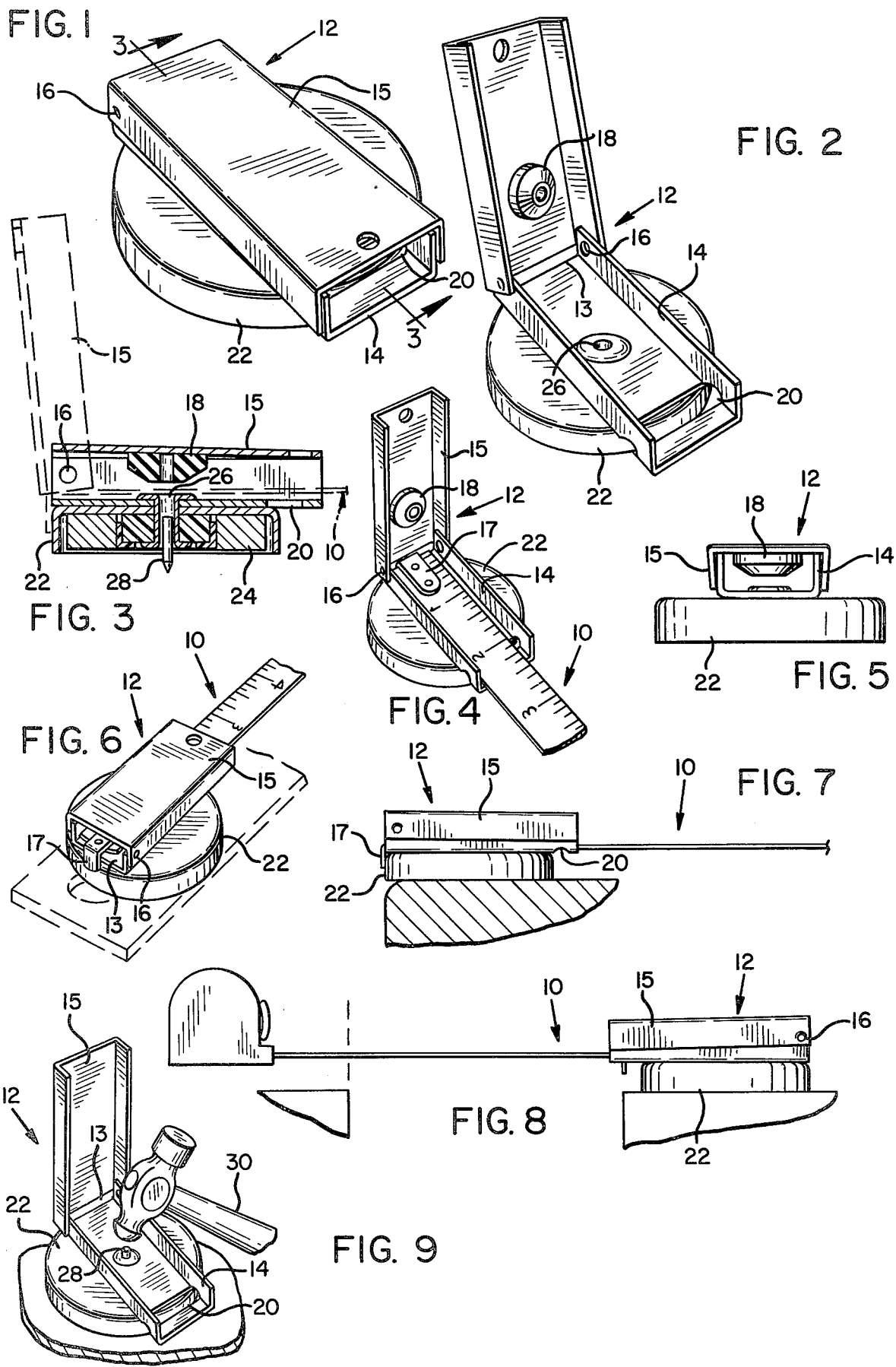

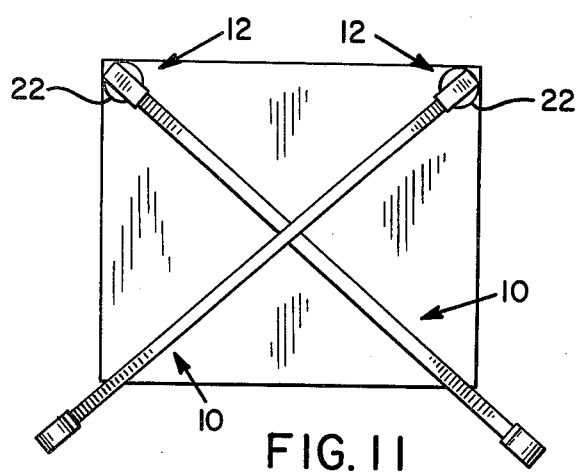
FIG. 11
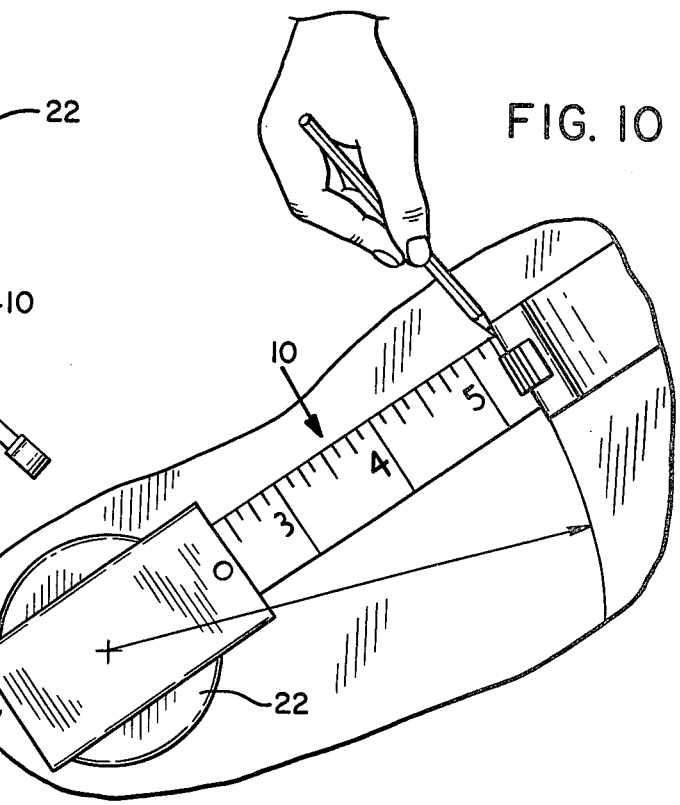
FIG. 10
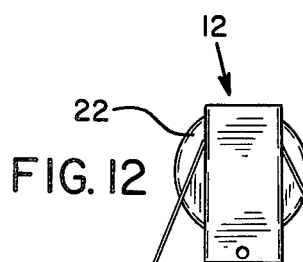
FIG. 12
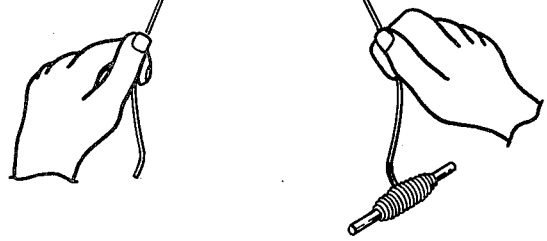
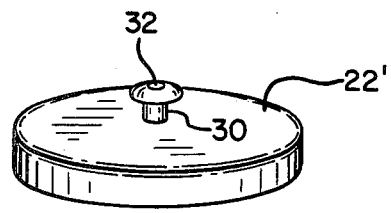
FIG. 14
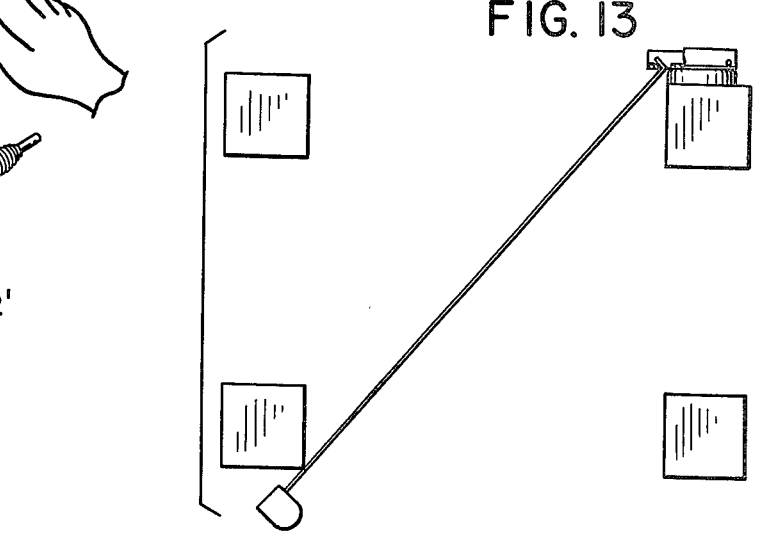
FIG. 13
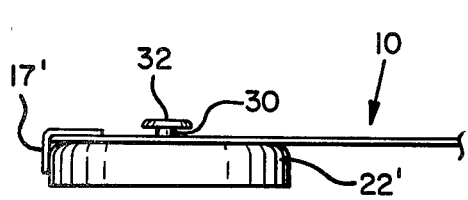
FIG. 15
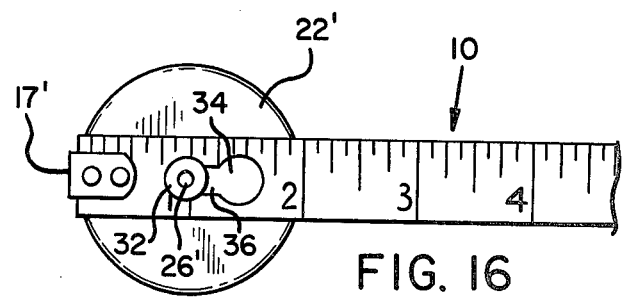
FIG. 16

APPARATUS FOR HOLDING AND POSITIONING A MEASURING TAPE

BACKGROUND AND SUMMARY OF THE INVENTION

This invention relates to an apparatus for holding the zero end of a measuring tape and positioning it at a desired location to facilitate measurement between two points by a single person.

Flexible metal measuring tapes are equipped with a positioning tab at their zero end which can be hooked over the edge of an object being measured. Thus a person can measure the distance from this edge to another point without the necessity of a helper to hold the end of the tape in position. However, when it is necessary to measure between two points lying on a surface, or to measure away from the edge of the surface, a second person is required to hold the zero end of the tape. Also, the use of a plumb line often requires two people; one to hold the top of the line and another to mark the bottom point. Likewise a chalk line requires a holder at each end.

The present invention provides an apparatus which overcomes the foregoing difficulties and allows a single person to perform many measuring and marking procedures that would otherwise require two people.

The apparatus comprises a clamp for receiving the tape and securing it in place. In the preferred embodiment the clamp includes a receptacle, in the form of a C-shaped channel, which is arranged to receive the tape, and a cover which fits over the top of the receptacle to hold the tape in position. The cover is pivotally attached to the receptacle for movement between a closed position where it overlies the receptacle and an open position where it uncovers the receptacle. When the cover is in its open position the L-shaped locating tab located at the zero end of a steel measuring tape is hooked over the end of the receptacle to which the cover is pivotally joined. Then when the cover is moved to its closed position it secures the tape in place in the receptacle. In addition, a slot, designed to receive the tab on the tape, is located at the other end of the receptacle to facilitate measurement from either end of the receptacle.

The receptacle is rotatably joined to a base which contains a magnet so that it can be magnetically attached to any ferro-magnetic surface. The base and receptacle are joined by a rivet that contains a medial orifice which extends through both the base and the magnet. Freely slidably located within the orifice is a pin which is longer than the orifice and which has a pointed tip. Accordingly, when the base is magnetically adhered to a supporting surface and the top of the pin is tapped with a hammer, the point of the pin makes a slight indentation into the surface. When this occurs the interaction of the pin with the indentation cooperates with the magnetic attraction of the holder to provide a greater amount of resistance to sliding than would be possible only with the magnet.

Accordingly, it is a principal object of the present invention to provide an apparatus for holding a measuring tape and positioning its zero end at a desired location.

It is a further object of the present invention to provide such an apparatus which attaches to a ferromagnetic surface.

It is a further object of the present invention to provide such an apparatus which will receive and secure the tape quickly and easily.

It is a further object of the present invention to provide such an apparatus which allows measurement from either of its ends.

It is a further object of the present invention to provide such an apparatus where the tape holder is rotatable relative to the base in order to find diagonals and to swing arcs.

It is a still further object of the present invention to provide such an apparatus which will also hold a plumb line, chalk line or the like.

The foregoing and other objectives and advantages of the present invention will be more readily understood upon consideration of the following detailed description of the invention taken in conjunction with the accompanying drawings.

BRIEF DESCRIPTION OF THE DRAWINGS

FIG. 1 is a pictorial view of a tape holder embodyin the features of the present invention in a closed position.

FIG. 2 is a perspective view of the tape holder of FIG. 1, at a reduced scale, in an open position.

FIG. 3 is a cross-sectional view of the tape holder, taken on the line 3—3 in FIG. 1.

FIG. 4 is a pictorial view of the tape holder with a tape installed.

FIG. 5 is an end elevational view of the tape holder.

FIG. 6 is a pictorial view showing one manner in which the tape holder is used.

FIG. 7 is a side elevational view showing another manner in which the tape holder is used.

FIG. 8 is a side elevational view showing still another manner in which the tape holder is used.

FIG. 9 is a pictorial view showing the manner in which the tape holder is installed.

FIG. 10 is a plan view showing another manner in which the tape holder is used.

FIG. 11 is a plan view of still another manner in which the tape holder is used.

FIG. 12 is a plan view of yet another manner in which the tape holder is used.

FIG. 13 is a plan view of still another manner in which the tape holder is used.

FIG. 14 is a pictorial view of another embodiment of the present invention.

FIG. 15 is a side elevational view of the tape holder of FIG. 14.

FIG. 16 is a plan view of the tape holder of FIG. 14.

DETAILED DESCRIPTION OF A PREFERRED EMBODIMENT

Referring to the drawings, the present invention provides an apparatus for holding and positioning the zero end of a measuring tape, such as the flexible metal tape 10 illustrated in FIG. 4, in a manner such that the zero end of the tape is placed in a known position. Thus the tape can be extended and used to measure from that known position to any other desired position without the necessity of having a second person hold its zero end.

The apparatus includes clamping means 12 for receiving the tape and securing it in the apparatus. The clamping means comprises a receptacle 14, which in the embodiment illustrated is a C-shaped channel, having a width which is approximately equal to the width of the tape. Pivotally joined to a first end 13 of the receptacle is a cover 15, which also comprises a C-shaped channel, but one which is slightly wider than the receptacle so that it will fit over its top.

The pivot 16 by which the cover is joined to the receptacle is illustrated as being paired holes in opposed sides of the receptacle and paired dimples in the cover. However, any pivot means which would allow movement of the cover between a closed position where it completely overlies the receptacle, FIG. 1, and an open position where it uncovers the receptacle, FIG. 2, would suffice. When the cover is in its open position the tape can be inserted into the receptacle with the L-shaped tab 17, which is located at the end of the tape, being hooked over the open first end of the receptacle. Then when the cover is moved to its closed position it covers the tape and holds it in place in the receptacle. While this holding action could be accomplished by the cover and receptacle themselves, in the embodiment illustrated the receptacle has a depth which would allow the tab 17 to become unhooked when the cover is in its closed position, and the tape is held in place by means of a snubbing device 18 which is placed in the cover near its first end.

In order to prevent the cover from inadvertently becoming opened, its lower edges are bent inwardly in order to slidably engage the sides of the receptacle when the cover is in its closed position thus creating a detent.

Located at the other end of the receptacle is a slot 20 which is arranged to receive the tab 17. Thus the apparatus can be used to position the zero end of the tape adjacent to the edge of a surface when measuring away from the surface, as shown in FIG. 8.

The receptacle is rotatably joined by pivot means to a base which supports the apparatus. The base includes means for securing it to a work surface, which in the embodiment illustrated comprises a magnet 24, FIG. 3, which preferably is situated approximately flush with the bottom of the base. Thus if the apparatus is placed on a ferro-magnetic surface it will be held fast even though the clamp and the tape are rotatable.

The receptacle is joined to the base by a rivet 25 which not only acts as the pivot means and allows these elements to rotate relative to one another but, in addition, forms an orifice 26 which extends through both the base and the magnet. Located in the orifice is a pin 28 which has a pointed tip. The pin has a diameter which allows it to slide freely in the orifice and a length which is longer than the length of the orifice. The pin is preferably made from a ferro-magnetic material and the magnet is oriented such that it holds the pin in a position where its excess portion projects downwardly below the base, as shown in FIG. 3.

In another embodiment of the invention, FIGS. 14, 15 and 16, the clamping means and the pivot means are integral. In this embodiment the base 22' is cylindrical and has an upstanding cylindrical stud 30 located at its center. Attached to the extremity of the stud is a cylindrical cap 32 which has a larger diameter and is much shorter than the stud.

In this embodiment the tape measure 10 has a keyhole shaped opening passing through it near its zero end. The opening has a first portion 34 which has a diameter which will allow it to be placed over the cap 32 and a second portion 36 which has a diameter which will allow it to fit over the stud and not the cap.

The opening is positioned in the tape such that when the first portion 34 is placed over the cap and the tape is pulled away from the base the second portion is placed around the stud and under the cap. Thus the tape measure becomes locked in place on the apparatus. The opening is also placed such that when the second portion is over the stud the tab 17' of the tape measure overlies the periphery of the base.

In this embodiment the orifice 26' which receives the pin 28 passes medially through the stud 30.

In operation of the preferred embodiment, the base 22 is first positioned on a supporting surface so that the first end 13 of the receptacle 14 is located above the position from which a desired measurement is to be made. With the preferred embodiment, which is used with ferromagnetic support surfaces, the magnet 24 holds the base in the position in which it is placed. If it is desired to further secure the base to the support surface, the top end of the pin 28 is tapped with a hammer 30, FIG. 9, causing the point of the pin to form a slight depression in the support surface. Since the magnet continues to urge the pin downwardly, the point will remain in the depression which is formed unless it is manually removed. Also since the magnet will prevent the base from being lifted off of the support surface, the pin interacts with the indentation to provide a much greater resistance to sliding displacement of the base than the magnet would alone. In addition, the pin can be used to center the apparatus on a center punch mark which will allow for measurement from the mark by knowing the exact distance between the center of the orifice 26 and the first end of the receptacle.

The cover is then raised to its open position, FIG. 4, and the tape 10 is installed by hooking the tab 17 over the first end of the receptacle. When the cover is again closed the snubbing device 18 prevents the tape from being lifted enough to allow the tab to become unhooked thus securing the tape within the receptacle.

Due to the fact that the receptacle rotates relative to the base, the tape can be rotated to measure in any desired direction. As a result, the device can be used to check diagonals FIG. 11 or swing a radius FIG. 10.

When it is necessary to measure away from the edge of a surface, the base is placed on the surface in a manner such that the slot 20 lies above the edge, FIG. 7. The slot 20 can also be used when measuring outside diagonals, such as between upstanding posts FIG. 13.

In addition, the apparatus can be used for many non-measurement operations such as holding one end of a plumb line or a chalk line FIG. 12, or two of the apparatus can be used to stretch a line between two points to establish a reference line. In any of the foregoing uses the apparatus allows a single person to perform many operations which otherwise required two or more persons.

The operation of the embodiment illustrated in FIGS. 14, 15 and 16 is similar except that the tape is secured by placing the first portion 34 of the opening over the cap 32. The tape 10 is then pulled to locate the second portion 36 of the opening over the stud.

The terms and expressions which have been employed in the foregoing description are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. Apparatus for holding and positioning the zero end of a flexible metal measuring tape having a downwardly extending tab at the end thereof comprising:
   (a) a base, including means for securing said base releasably to a planar work surface;
   (b) clamping means associated with said base for receiving and securing the measuring tape in a manner such that the extremity thereof is located in a defined position;
   (c) pivot means for allowing the measuring tape to rotate relative to said base about an axis which is perpendicular to said work surface; and
   (d) wherein said clamping means comprises;
      (1) a receptacle having an open top arranged to receive the tape therein said receptacle being rotatably joined to said base,
      (2) a cover for enclosing the top of said receptacle,
      (3) means joining said cover pivotally to said receptacle said cover being movable between a closed position where it covers said receptacle and an open position where it uncovers said receptacle.

2. The apparatus of claim 1 including snubbing means associated with said cover for preventing release of the tape when it is placed in said receptacle with its tab hooked over the front end thereof and said cover is in its closed position.

3. The apparatus of claim 1 including detent means associated with said cover and said receptacle for holding said cover in its closed position.

4. The apparatus of claim 1 wherein said receptacle has a slot located therein, said slot being arranged to receive said tab.

5. Apparatus for holding and positioning the zero end of a flexible metal measuring tape having a downwardly extending tab at the end thereof comprising:
   (a) a base, including means for securing said base releasably to a planar work surface;
   (b) clamping means associated with said base for receiving and securing the measuring tape in a manner such that the extremity thereof is located in a defined position;
   (c) pivot means for allowing the measuring tape to rotate relative to said base about an axis which is perpendicular to said work surface;
   (d) wherein said clamping means comprises;
      (1) a receptacle having an open top arranged to receive the tape therein, said receptacle being rotatably joined to said base,
      (2) a cover for enclosing the top of said receptacle,
      (3) means joining said cover pivotally to said receptacle said cover being movable between a closed position where it covers said receptacle and an open position where it uncovers said receptacle;
   (e) wherein said means for securing said base to a work surface comprises a magnet.

6. The apparatus of claim 5 wherein said base defines an orifice which passes therethrough and said means for securing said base to a work surface further comprises a pin having a length longer than the length of said orifice and having a pointed end, said pin being arranged to fit snugly through said orifice.

7. Apparatus for holding and positioning the zero end of a measuring tape comprising:
   (a) a base, including a magnet for securing said base releasably to a planar work surface;
   (b) clamping means associated with said base for receiving and securing the measuring tape in a manner such that the extremity thereof is located in a defined position;
   (c) pivot means for allowing the measuring tape to rotate relative to said base about an axis which is perpendicular to said work surface;
   (d) wherein said base defines an orifice which passes therethrough and said means for securing said base to a work surface further comprises a pin having a length longer than the length of said orifice and having a pointed end, said pin being arranged to freely fit through said orifice.

* * * * *